United States Patent [19]
Aiso et al.

[11] Patent Number: 5,779,405
[45] Date of Patent: Jul. 14, 1998

[54] THERMAL DISPLACEMENT CORRECTING APPARATUS FOR MACHINE TOOL

[75] Inventors: Katsuyoshi Aiso; Takeshi Goto; Kenichi Suzuki; Tadashi Sasaki, all of Shizuoka-ken, Japan

[73] Assignee: Toshiba Kikai Kabushiki Kaisha, Tokyo, Japan

[21] Appl. No.: 413,870

[22] Filed: Mar. 29, 1995

[30] Foreign Application Priority Data

Mar. 30, 1994 [JP] Japan ..................... 6-061334

[51] Int. Cl.$^6$ .................................. B23C 9/00
[52] U.S. Cl. .............. 409/132; 364/474.15; 364/474.35; 364/474.37; 408/13; 409/135; 409/239
[58] Field of Search .................. 364/474.15, 474.18, 364/474.34, 474.35, 474.37; 384/446, 493, 557, 905; 407/231, 239, 135; 408/11, 13; 409/132, 238, 131, 231, 239, 135

[56] References Cited

U.S. PATENT DOCUMENTS

| | | | |
|---|---|---|---|
| 3,045,510 | 7/1962 | Brainard | 408/3 |
| 4,131,837 | 12/1978 | Whetham | 318/571 |
| 4,382,215 | 5/1983 | Barlow et al. | 318/568.1 |
| 4,392,195 | 7/1983 | Inoue | 364/167 |
| 4,471,443 | 9/1984 | Kinoshita et al. | 364/474.35 |
| 4,581,808 | 4/1986 | Lawson et al. | 408/13 |
| 4,784,541 | 11/1988 | Umehara et al. | 409/186 |
| 4,808,048 | 2/1989 | Miller | 409/239 |
| 4,919,575 | 4/1990 | Yoshimi et al. | 409/231 |
| 5,095,788 | 3/1992 | Matoni | 364/474.34 |
| 5,214,592 | 5/1993 | Serizawa et al. | 409/238 |
| 5,387,061 | 2/1995 | Barkman et al. | 409/80 |
| 5,523,953 | 6/1996 | Araie et al. | 364/474.35 |

FOREIGN PATENT DOCUMENTS

| | | | |
|---|---|---|---|
| 61-59860 | 12/1961 | Japan . | |
| 58-132441 | 8/1983 | Japan | 409/135 |
| 60-20839 | 2/1985 | Japan . | |
| 6-8107 | 1/1994 | Japan . | |
| 740409 | 6/1980 | U.S.S.R. | 408/13 |

OTHER PUBLICATIONS

English Abstract of JP61-59860.

*Primary Examiner*—A. L. Pitts
*Assistant Examiner*—Christopher Kirkman
*Attorney, Agent, or Firm*—Finnegan, Henderson, Farabow, Garrett & Dunner, L.L.P.

[57] ABSTRACT

A thermal displacement correcting apparatus suitable for a machine tool (1) provided with a mechanism for feeding a main spindle (2) is disclosed. Three magnetic flux generating bodies 61 to 63 are fixed to the main spindle; a magnetic sensor (7) is fixed to the machine tool to detect the magnetic flux generated by the magnetic flux generating body at each predetermined spindle feed position; a thermal displacement value detecting section (14A) detects the thermal displacement values of the main spindle on the basis of outputs of the magnetic sensor at the respective spindle feed positions; a thermal displacement correction value calculating section (15) calculates a correction function on the basis of the detected thermal displacement values and previously determined reference values, and obtains the thermal displacement correction value in accordance with the calculated correction function at each spindle feed position; and a spindle feed command correcting section (16) corrects the spindle feed command applied to the spindle feed motor on the basis of the obtained thermal displacement correction value at each spindle feed position.

13 Claims, 5 Drawing Sheets

THERMAL DISPLACEMENT CORRECTING APPARATUS FOR MACHINE TOOL

BACKGROUND OF THE INVENTION

1. Technical Field

The present invention relates to a thermal displacement correcting apparatus for correcting thermal displacement value of a main spindle or a spindle feed mechanism of a spindle feed-out mechanism of a machine tool.

2. Description of the Related Art

An example of the thermal displacement correcting apparatus for a machine tool is disclosed in Japanese Published Examined Patent Application No. 61-59860. In this prior art thermal displacement correcting apparatus, temperatures are detected along the axial direction of a main spindle of a machine tool. A temperature difference between the maximum heat generation portion (e.g., the head nose of a main spindle) and another relatively low temperature portion; and a formula representative of the relationship between the obtained temperature difference and the thermal displacement at the maximum heat generation portion is obtained. The thermal displacement then is corrected on the basis of the measured temperature difference and in accordance with the obtained formula.

When this prior art thermal displacement correcting apparatus is applied to a machine tool provided with a spindle feed-out mechanism, however, since the displacement value of the main spindle is subjected to the influence of various displacement values in the work-axial direction positioning mechanism for feeding the main spindle in the work-axial (main spindle) feeding direction, it is difficult to determine the above-mentioned formula representative of the relationship between the temperature difference and the thermal displacement value at the maximum heat generation portion. Thus, it is impossible to correct the thermal displacement of the spindle in the work-axial direction precisely.

In addition, in the prior art thermal displacement correcting apparatus of this sort, the thermal displacement is corrected on the basis of such an assumption that the relationship between the temperature change and the thermal displacement value at the main spindle is always constant. In practice, however, there exists a problem in that the above-mentioned assumption cannot be established due to fluctuations of spindle thermal transmission rate, spindle heat capacity, workshop environment, etc.

SUMMARY OF THE INVENTION

With these problems in mind therefore, it is the object of the present invention to provide a thermal displacement correcting apparatus for a machine tool, which can correct the thermal displacement of a main spindle or a spindle feed mechanism of a machine tool provided with a spindle feed-out mechanism at high precision in spite of a relatively simple apparatus structure.

To achieve the above-mentioned object, the present invention provides a thermal displacement correcting apparatus for a machine tool (1) provided with a mechanism for feeding a main spindle (2) via a spindle feed mechanism (5) by applying a spindle feed command to a spindle feed motor (4). The correcting apparatus comprises: at least one magnetic flux generating body (6) fixed to any one of the main spindle and the spindle feed mechanism; a magnetic sensor (7) fixed to the machine tool, for detecting magnetic flux generated by said magnetic flux generating body whenever said magnetic flux generating body is fed to a predetermined spindle feed position; means (14A) for detecting a thermal displacement value of any one of the main spindle and the spindle feed mechanism on the basis of an output of said magnetic sensor; means (15) for calculating a thermal displacement correction value by comparing the detected thermal displacement value with a previously determined reference value; and means (16) for correcting the spindle feed command applied to the spindle feed motor on the basis of the calculated thermal displacement correction value.

Further, in the thermal displacement correcting apparatus for a machine tool according to the present invention, when a plurality of said magnetic flux generating bodies are fixed, said thermal displacement correction value calculating means (15) calculates a correction function on the basis of the detected thermal displacement values and the previously determined reference values, and obtains the thermal displacement correction values.

Further, the thermal displacement correcting apparatus further comprises means (17) for moving said magnetic sensor (7) to the vicinity of said magnetic flux generating body (6) in a direction perpendicular to the main spindle, whenever said magnetic flux generating body is fed to a predetermined spindle feed position by the spindle feed mechanism in response to the spindle feed command, to input a detection signal of said magnetic sensor (7) to said thermal displacement value detecting means (14).

Further when the spindle motor is a step motor, said spindle feed command correcting means (16) corrects the number of pluses applied to the step motor. Further, the previously determined thermal displacement reference value is detected and stored before the main spindle or the spindle feed mechanism is thermally displaced or inputted manually.

Further, the thermal displacement correction is executed under and simultaneously with control of a numerical control system for a machine tool.

Further, the present invention provides a method of correcting thermal displacement of a machine tool (1) provided with a mechanism for feeding a main spindle (2) via a spindle feed mechanism (5), by applying a spindle feed command to a spindle feed motor (4). The method comprises the steps of: stopping the main spindle at a predetermined first spindle feed position for initialization; feeding the main spindle to a second spindle feed position; detecting the main spindle position magnetically with a predetermined sensitivity to obtain a second spindle feed position signal; storing the detected second spindle feed position signal; feeding the main spindle to a third spindle feed position; detecting the main spindle position magnetically with the predetermined sensitivity to obtain a third spindle feed position signal; storing the detected third spindle feed position signal; calculating a correction function on the basis of the detected and stored second and third spindle feed position signals and previously determined reference values at the second and third spindle feed positions; calculating thermal displacement correction values at the second and third spindle feed position in accordance with the calculated correction function; and correcting the spindle feed command applied to the spindle feed motor at the second and third spindle feed positions on the basis of the calculated thermal displacement correction values, respectively.

Further, the method of correcting thermal displacement of a machine tool (1) further comprises the step of detecting a thermal displacement correction mode of a numerical control system of the machine tool to start the above steps.

As described above, in the thermal correction apparatus for a machine tool according to the present invention, the thermal displacement value is detected at a predetermined spindle feed position by a magnetic flux generating body fixed to the main spindle or the spindle feed shaft; the detected thermal displacement value is compared with a reference thermal displacement value to calculate a correction value at the predetermined spindle feed position; and the spindle feed command is corrected on the basis of the calculated correction value. Therefore, even if the thermal displacement value of the main spindle contains the thermal displacement value of the spindle feed mechanism, it is possible to correct the thermal displacement of the main spindle accurately under consideration of various fluctuations of spindle thermal transmission rate, spindle heat capacity, workshop environment, etc.

Further, in the thermal displacement correcting apparatus for a machine tool described above, the thermal displacement values are detected at a plurality of predetermined spindle feed positions by a plurality of magnetic flux generating bodies fixed to the main spindle or the spindle feed mechanism; a correction function is calculated on the basis of the detected thermal displacement values and the reference values at the respective spindle feed positions; the correction values are calculated at the predetermined spindle feed positions, respectively in accordance with the calculated correction function; and the spindle feed commands are corrected on the basis of the calculated correction values at the respective spindle feed positions. Therefore, even if the thermal displacement value of the main spindle contains the thermal displacement value of the spindle feed mechanism, it is possible to correct the thermal displacement of the main spindle accurately under consideration of various fluctuations of spindle thermal transmission rate, spindle heat capacity, workshop environment, etc., even if the main spindle is fed out over a long distance.

DETAILED DESCRIPTION OF THE PREFERRED EMBODIMENTS

The embodiments of the thermal displacement correcting apparatus for a machine tool according to the present invention will be described hereinbelow with reference to the attached drawings.

Figure 1:
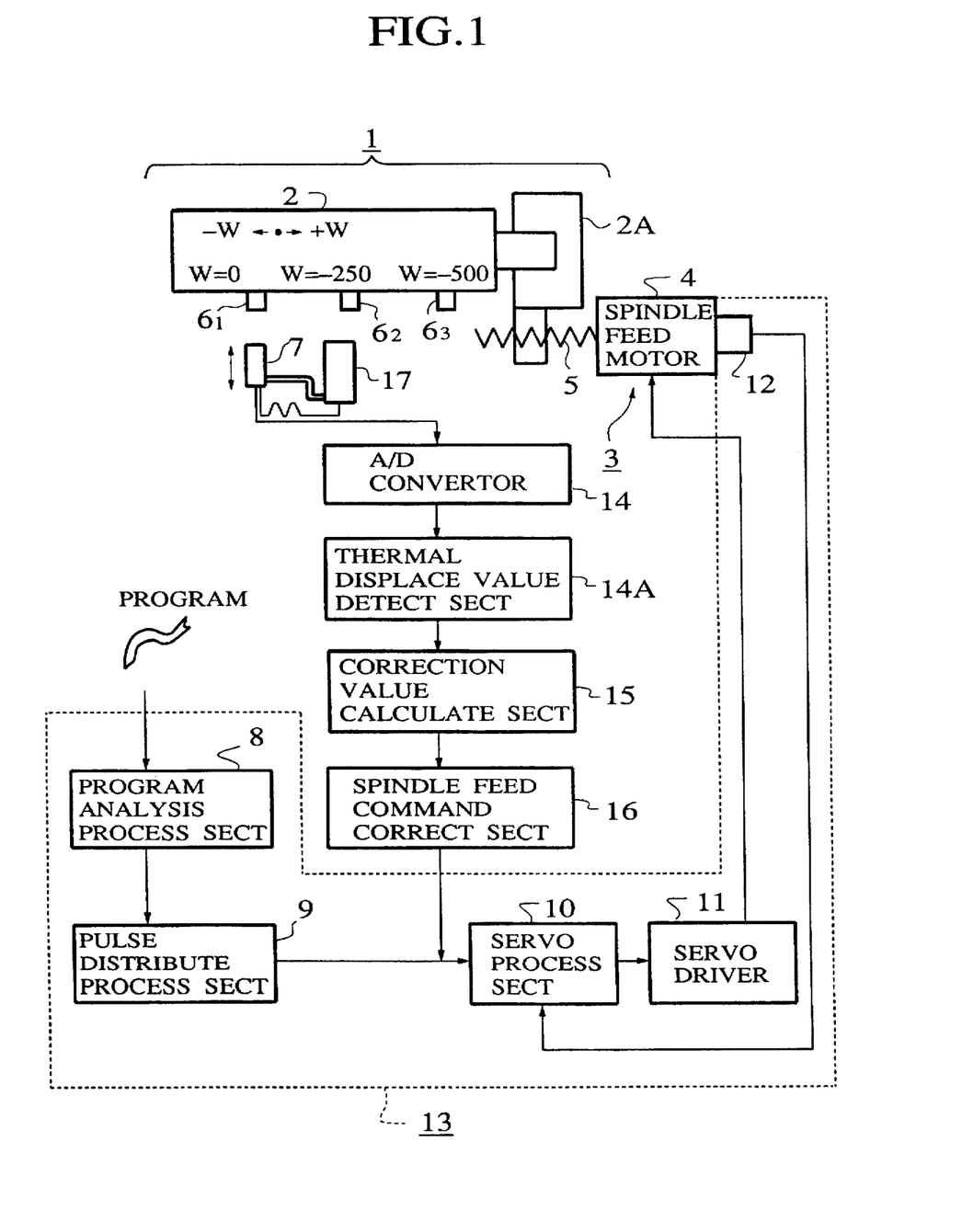
FIG. 1 is a schematic block diagram showing a system construction of a machine tool, to which a first embodiment of the thermal displacement correcting apparatus according to the present invention is applied.

FIG. 1 shows a system structure of a machine tool to which the first embodiment of the present invention is applied.

In FIG. 1, the machine tool 1 is provided with a spindle feed-out mechanism 3. The spindle feed-out mechanism 3 has a work axis motor (spindle feed step motor) 4 for rotating a ball screw (spindle feed mechanism) 5 to feed a support portion 2A of a main spindle 2 in a work axial direction (the same as spindle axial direction). On the main spindle 2 of the machine tool 1, a plurality of magnetic flux generating bodies 61 to 63 (whose effective length: about 4 mm) are fixed at predetermined intervals along the axial direction of the main spindle 2.

Figures 2, 3:
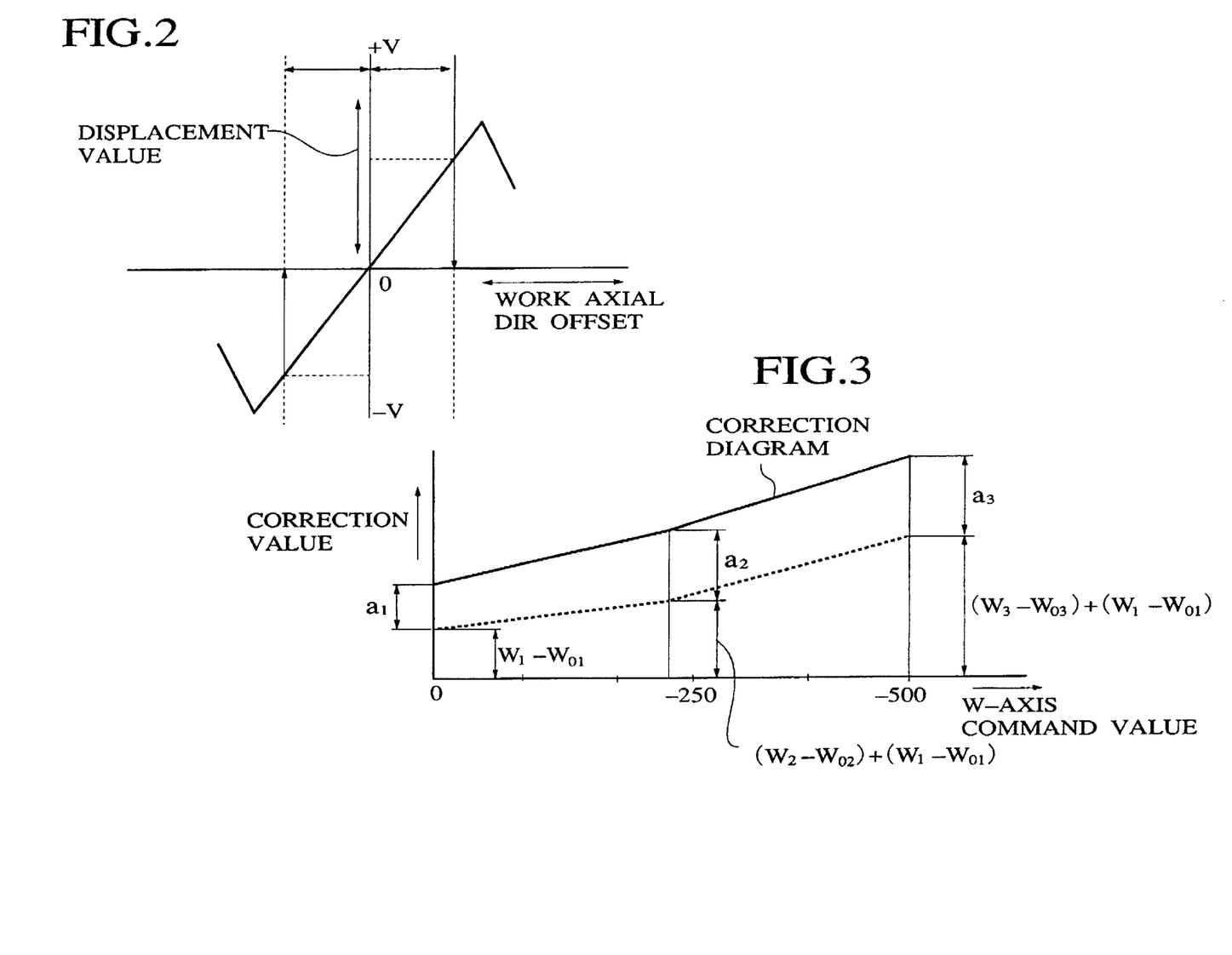
FIG. 2 is a graphical representation showing an example of the output of a magnetic sensor, in which thermal displacement value changes according to the work axial direction offset from a reference spindle feed position.
FIG. 3 is a graphical representation showing a correction function for correcting the thermal displacement values of the main spindle or the feed mechanism at three spindle feed positions.

On the other hand, a movable magnetic sensor 7 is mounted at a predetermined position on a housing (not shown) of the machine tool 1 so as to be moved to the vicinity of the main spindle 2 in a direction perpendicular to the axial direction of the main spindle 2. The movable magnetic sensor 7 is coupled to a mechanical and electrical sensor signal input section 17. Whenever a work-axis (or spindle) feed command (described later) is applied to the feed-out mechanism 3 and thereby one of the magnetic flux generating bodies 61 to 63 is moved and located at a predetermined spindle feed position, the detection signal input section 17 advances the magnetic sensor 7 to the vicinity of the magnetic flux generating body to detect the magnetic flux thereof. The sensor signal of the magnetic sensor 7 is inputted to an A/D converter 14, and the converted digital signal is applied to a thermal displacement value detection section 14A. Here, the detection signal of the magnetic sensor 7 represents an offset of the magnetic flux generating bodies 61 to 63 in the work axial direction, that is, a thermal displacement value of the main spindle 2, as shown in FIG. 2.

The machine tool 1 provided with the above-mentioned magnetic flux generating bodies 61 to 63 and the magnetic sensor 7 is numerically controlled by an NC system 13. The NC system 13 is composed basically of a program analysis processing section 8, a pulse distribute processing section 9, a servo-control processing section 10, a servo-control driver 11, a position detector 12, etc.

In more detail, to numerically control the machine tool 1 by the NC system 13, a processing program is analyzed by the program analysis processing section 8. Data indicative of the number of pulses applied to the spindle feed step motor 4 is determined in accordance with the data analyzed by the pulse distribute processing section 9. Pulse signals for driving the spindle feed motor 4 are then generated by the servo-control processing section 10 on the basis of the pulse data processed by the pulse distribute processing section 9. Work axis (spindle) feed commands are outputted from the servo-control driver 11 to the spindle feed motor 4 to feed the main spindle 2, and the spindle feed motor 4 drives the ball screw 5 on the basis of the spindle feed commands. The angular position of the spindle feed motor 4 is then detected by a position detector 12 attached to the spindle feed motor 4 and fed back to the servo-control processing section 10, so that the main spindle 2 can be fed in the work axial direction and located at any predetermined spindle feed position under control of the servo-control processing section 10.

Although not shown in FIG. 1, the NC system 13 of course controls other various operations required for the machine tool 1 to process work chucked by the main spindle 2. In accordance with the basic numerical control of the main spindle 2 by the NC system 13, the main spindle 2 can be fed in the W-axis direction, so that work can be processed (e.g., cut off) appropriately.

In the above-mentioned NC control, however, the main spindle 2 and the ball screw (spindle feed mechanism) 5 for feeding the main spindle 2 are expanded or contracted thermally in the work axial direction. This thermal deformation or displacement makes it impossible to accurately feed or locate the main spindle 2 in the work axial direction without correcting the thermal displacement of the related parts.

Therefore, in this embodiment, when the thermal displacement correction mode is selected in the NC system 13, the NC system (referred to as control, hereinafter) 13 corrects the thermal displacement of the main spindle 2 or the ball screw (spindle feed mechanism) 5 under the following conditions and as follows:

<Measurement of thermal displacement values>

(1) The arrangement positions of the magnetic flux generating bodies 61 and 63 in the work axial direction are as follows:

a) Position of the magnetic flux generating body 61:
W=0 (a position of the magnetic sensor 7)

b) Position of the magnetic flux generating body 62:
W=−250 mm c) Position of the magnetic flux generating body 63:
W=−500 mm (2) Reference point setting:

Before the main spindle 2 or the ball screw 5 is displaced thermally, the thermal displacement value of the main spindle 2 or the ball screw 5 is measured at the respective positions W=0, W=−250, and W=−500 and the measured values W01, W02 and W03 are stored in storing means (e.g., RAM) (not shown). Or else, the above measured values W01, W02 and W03 can be inputted manually as parameters before the numerical control program is executed.

(3) Method of measuring thermal displacement values:

After the main spindle 2 or the ball screw 5 has been displaced thermally, the thermal displacement value of the main spindle 2 or the ball screw 5 is measured at the respective positions W=0, W=−250, and W=−500 (or any other given three positions) and the measured values W1, W2 and W3 (or any one of them) are stored in the same storing means.

<Correcting of thermal displacement values>

Correction of the W-axis (spindle) feed command is as follows.

A correction function as shown in FIG. 3 is calculated on the basis of the measured data (W01, W02, W03, W1, W2 and W3) and constant a1, a2 and a3 previously determined as parameters by experiments. Further, whenever the main spindle 2 or the ball screw 5 is fed and located on the basis of the spindle feed command, a correction value is determined in accordance with the correction function. The spindle feed command is then corrected on the basis of the determined correction value. In the case where the spindle feed motor 4 is a step motor, the number of pulses applied to the step motor 4 is corrected by adding or subtracting a correction value to and from the reference number of pulses to achieve thermal displacement correction of the main spindle 4 or the spindle feed mechanism 5.

In order to satisfy the above-mentioned measurement and correction conditions of the thermal displacement values, in the present invention, a thermal displacement correcting system is additionally provided for the NC system 13. That is, the thermal displacement correcting system is composed of the magnetic flux generating bodies 61 to 63, the magnetic sensor 7, an A/D converter 14, a thermal displacement value detecting section 14A, a correcting vale calculating section 15, and a spindle feed command correcting section 16. Therefore, the machine tool 1 can be controlled numerically by the NC system 13, while correcting the thermal displacement of the main spindle 2 or the ball screw 5.

In more detail, in the thermal displacement correcting system, the A/D converter 14 converts the output of the magnetic sensor 7 into a digital signal indicative of a thermal displacement value of the main spindle 2 or the ball screw 5, whenever the magnetic sensor 7 detects the magnetic flux of each of the magnetic flux generating bodies 61 to 63 arranged at the respective arrangement positions W=0, W=−250 and W=−500.

Before the main spindle 2 or the ball screw 5 is displaced thermally, the thermal displacement value detecting section 14A detects the thermal displacement value of the main spindle 2 or the ball screw 5 at each of the respective arrangement positions W=0, W=−250 and W=−500 of the magnetic flux generating bodies 61 to 63 on the basis of the digital signals outputted from the A/D converter 14. The detected values W01, W02 and W03 are stored in the storing means (e.g., RAM). Of course, these values W01, W02 and W03 can be inputted manually as parameters used when the numerical control program is executed.

Further, after the main spindle 2 or the ball screw 5 has been displaced thermally, the thermal displacement value detecting section 14A detects the thermal displacement value of the main spindle 2 or the ball screw 5 at each of the respective arrangement positions W=0, W=−250 and W=−500 of the magnetic flux generating bodies 61 to 63 on the basis of the digital signal outputted from the A/D converter 14. The detected values W1, W2 and W3 or at least one of them is stored in the storing means (e.g., RAM).

Further, the correction value calculating section 15 calculates a correction function, as shown in FIG. 3, on the basis of the detected data (W01, W02, W03, W1, W2 and W3) and constant a1, a2 and a3 previously determined as parameters by experiments.

The spindle feed command correcting section 16 corrects the spindle feed command by adding or subtracting the calculated correction value obtained in accordance with the correction function to and from the pulse data outputted by the pulse distribute processing section 9.

Figure 4:
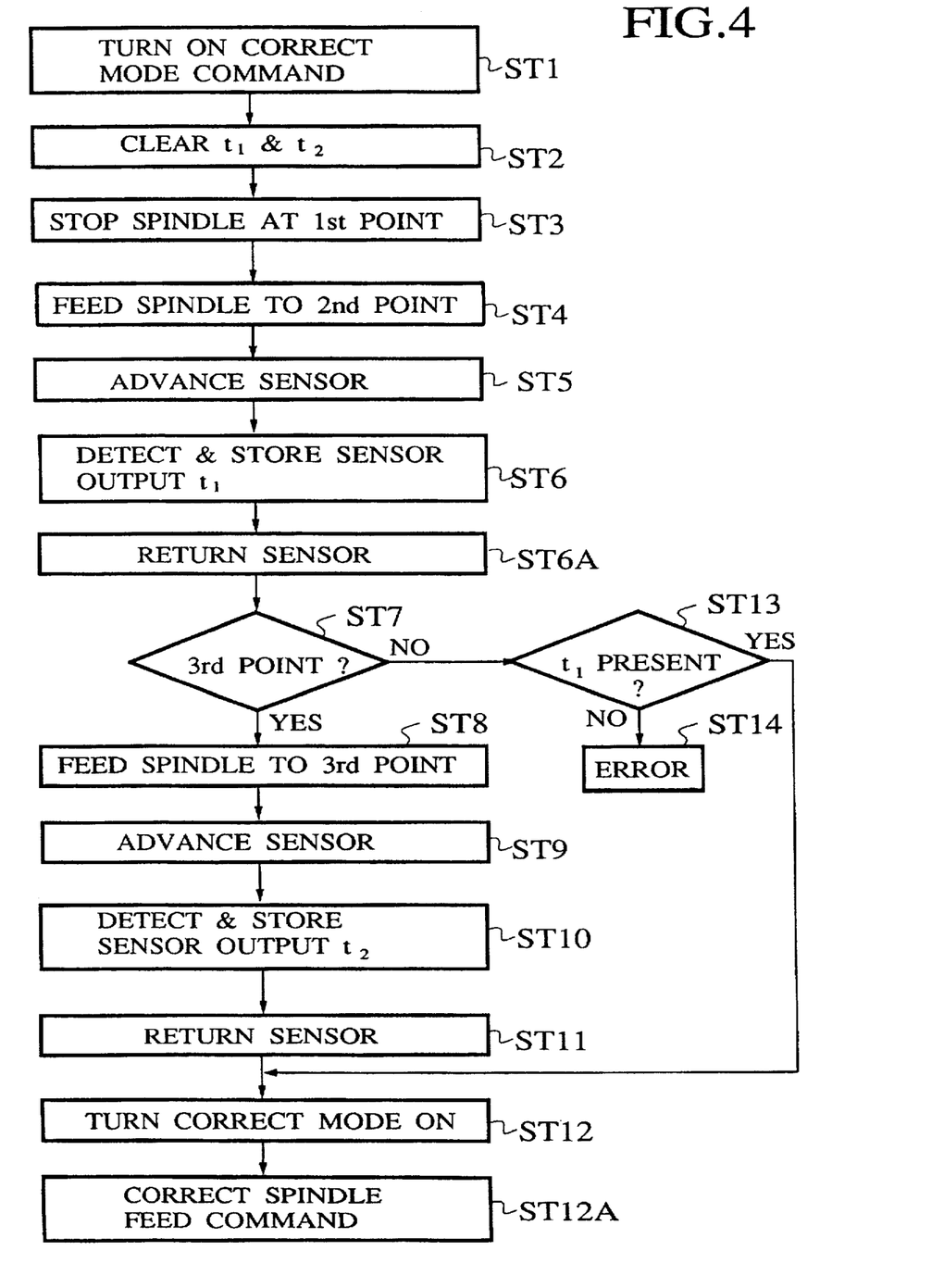
FIG. 4 is a flowchart showing the correction procedure of the first embodiment according to the present invention.

The function of the present embodiment will be explained in further detail with reference to a flowchart shown in FIG. 4. Here, the arrangement position W=−250 of the magnetic flux generating body is assumed to be a second R point, and the arrangement position W=−500 of the magnetic flux generating body is determined as a third R point. Further, the thermal displacement values of the main spindle 2 or the ball screw 5 at the second and third R points are assumed to be already stored in the RAM.

When a correction mode ON command is inputted to the NC system 13 (referred to as control) (in step ST1), control deletes the sensor output value t1 at the second R point and the sensor output value t2 at the third R point from the data detected in the preceding step and stored in a RAM (in step ST2). Further, control stops the main spindle 2 at the reference position (W=0) for initialization (orientation stop) (in step ST3).

After the main spindle 4 has been located at the second R point (in step ST4), control advances the magnetic sensor 7 to the vicinity of the magnetic flux generating body 62 and then stops the magnetic sensor 7 at a predetermined sensing position in order to detect the magnetic flux density of the magnetic flux generating body 62 at the second R point with a predetermined sensitivity (in step ST5). Control detects the sensor output t1 on the basis of the detection output of the magnetic sensor 7 at this predetermined sensing position, and further stores the obtained sensor output value t1 in the RAM (in step ST6).

After that, control returns the magnetic sensor 7 to the original position, and further checks whether or not the main spindle is fed and located at the third R point to detect the sensor output t2 (in step ST7). If YES, control locates the main spindle 2 at the third point (in step ST8), and further advances the magnetic sensor 7 to the magnetic flux generating body 63 and then stops the magnetic sensor 7 at a predetermined sensing position in order to detect the magnetic flux density of the magnetic flux generating body 63 at the third R point with the predetermined sensitivity (in step ST9). Control detects the sensor output t2 on the basis of the detection output of the magnetic sensor 7 at this predetermined sensing position, and further stores the obtained sensor output value t2 in the RAM (in step ST10). Further, control returns the magnetic sensor 7 to the original position (in step ST11), and sets a correction enable flag to ON to calculate a correction function as shown in FIG. 3 (in step ST12). Control corrects the spindle feed command by adding or subtracting a correction value to or from a reference value in accordance with the correction function (in step ST12A).

On the other hand, if NO in step ST7, that is, if control determines that only the sensor output t1 is sufficient, control checks whether the sensor output t1 is present (in step ST13). If YES; that is, if the sensor output t1 is confirmed (in step ST13), control skips the steps from ST8 to ST11, and sets the correction enable flag to ON (in step ST12). Further, control corrects the spindle feed command by adding or subtracting a reference correction value to or from the reference value (in step ST12A). Further, if NO in step ST13, since this indicates that the sensor output t1 is absent, control outputs an error (in step ST14) and for waits another correction mode ON command. In response to the succeeding correction mode ON command, control returns to the step ST2 again.

Figure 5:
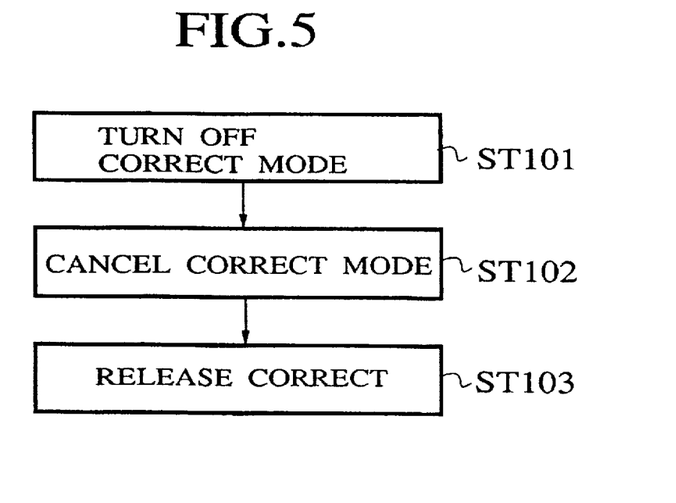
FIG. 5 is a flowchart showing the non-correction procedure of the first embodiment according to the present invention.

Further, as shown by the flowchart in FIG. 5, when a correction mode OFF command is inputted to the NC system 13 (control) (in step ST101), control cancels the correction mode (in step ST102) and further releases the correction (by addition or subtraction) in accordance with the calculated correction function (in step ST103).

In the above-mentioned first embodiment, the three magnetic flux generating bodies 61 to 63 are provided on the main spindle 2; the thermal displacement values of the main spindle 2 and the ball screw 5 are both detected together at the respective spindle feed positions; a correction function is calculated on the basis of the detected thermal displacement values and the reference values; and the spindle feed command is corrected on the basis of the correction value obtained in accordance with the calculated correction function, in order to correct the thermal displacement of the spindle or spindle feed position.

Figure 6:
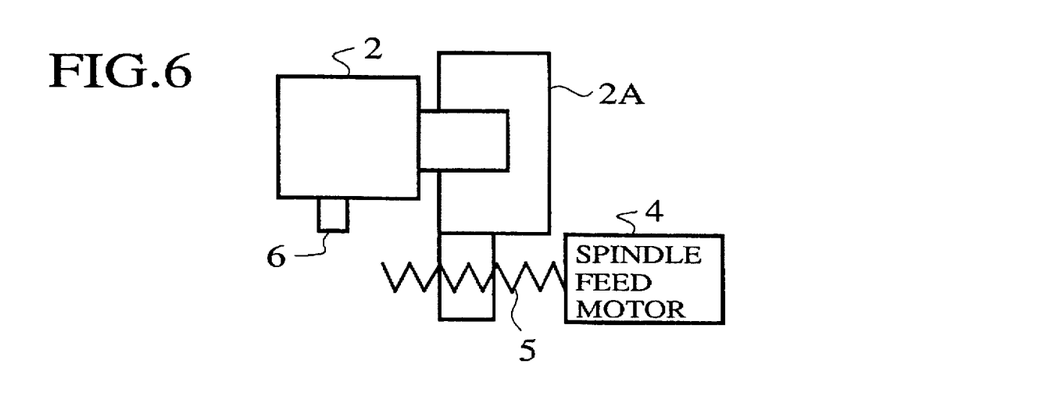
FIG. 6 is a view showing the main spindle and the magnet body of a second embodiment of the present invention.
Figure 7:
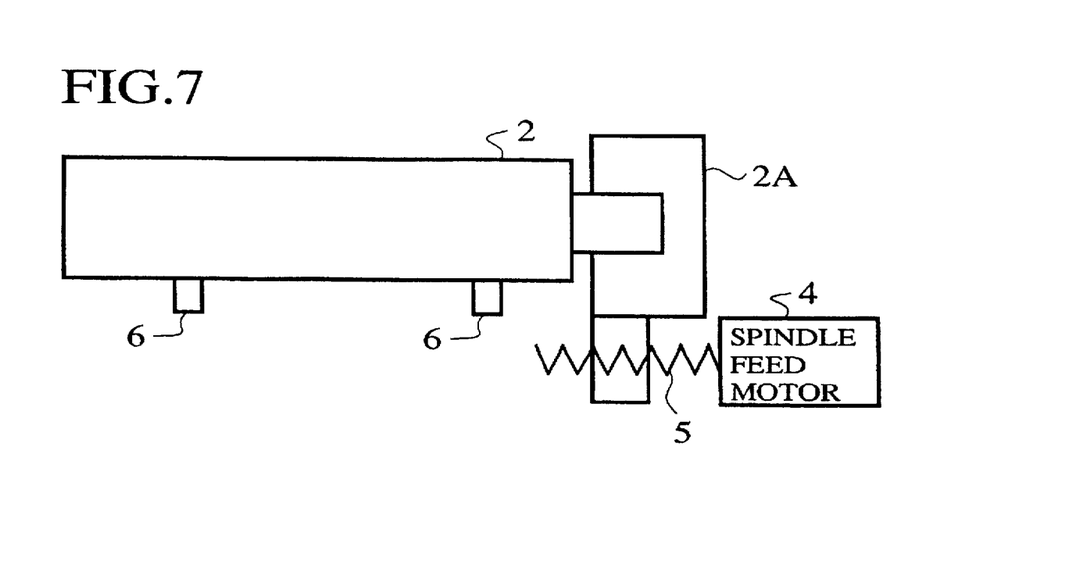
FIG. 7 is a view showing the main spindle and the magnet body of a third embodiment of the present invention.
Figure 8:
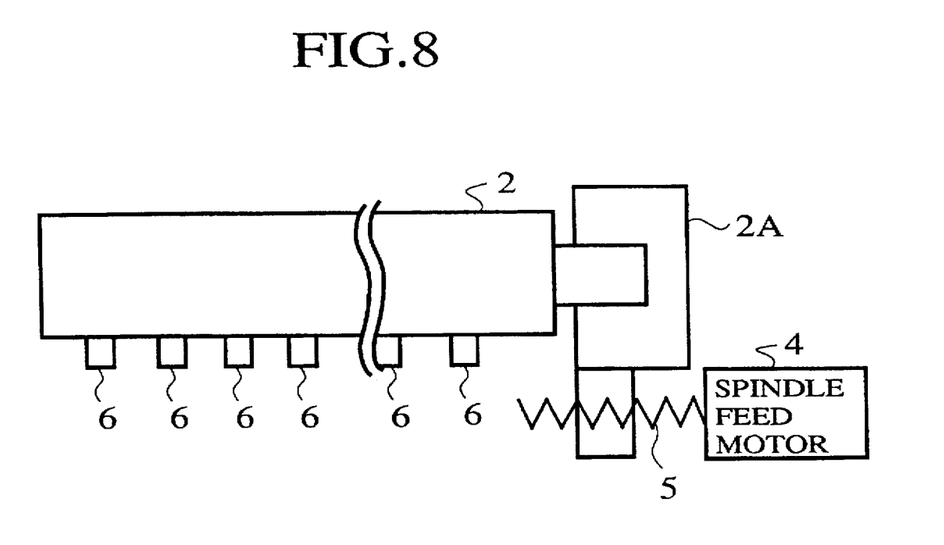
FIG. 8 is a view showing the main spindle and the magnet body of a fourth embodiment of the present invention.

Without being limited only to the above-mentioned embodiment, it is possible to change the number of the magnetic flux generating bodies 6 to one (as shown in FIG. 6) or two (as shown in FIG. 7) or six or more (as shown in FIG. 8). When a plurality of magnetic flux generating bodies are provided on the main spindle, since the thermal displacement values of the main spindle can be corrected at different spindle feed positions independently, these embodiments are effective, in particular when the axial lengths of the main spindle and the spindle feed mechanism are long.

Figure 9:
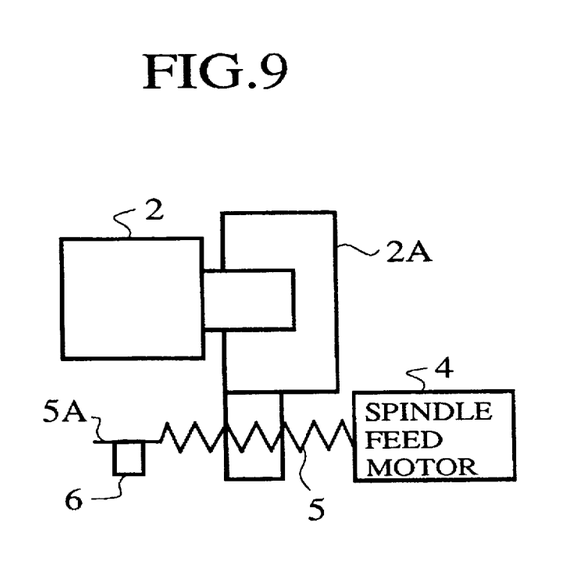
FIG. 9 is a view showing the main spindle and the magnet body of a fifth embodiment of the present invention.

Further, in the above-mentioned embodiment, although the magnetic flux generating bodies 6 are mounted on the main spindle 2, without being limited only thereto, it is also possible to mount the magnetic flux generating body 6 on an end 5A of the ball screw (the spindle feed mechanism) 5, as shown in FIG. 9.

As described above, in the thermal correction apparatus for a machine tool according to the present invention, the thermal displacement value is detected at a predetermined spindle feed position by a magnetic flux generating body fixed to the main spindle or the spindle feed mechanism; the detected thermal displacement value is compared with a reference thermal displacement value to calculate a correction value at the predetermined spindle feed position; and the spindle feed command is corrected on the basis of the calculated correction value. Even if the thermal displacement value of the main spindle contains the thermal displacement value of the spindle feed mechanism, it is possible to correct the thermal displacement of the main spindle accurately under consideration of various fluctuations of spindle thermal transmission rate, spindle heat capacity, workshop environment, etc.

Further, in the thermal displacement correcting apparatus for a machine tool described above the thermal displacement values are detected at a plurality of predetermined spindle feed positions by a plurality of magnetic flux generating bodies fixed to the main spindle or the spindle feed mechanism; a correction function is calculated on the basis of the detected thermal displacement values and the reference values at the respective spindle feed positions; the correction values are calculated at the predetermined spindle feed positions, respectively in accordance with the calculated correction function; and the spindle feed commands are corrected on the basis of the calculated correction values at the respective spindle feed positions. Therefore, even if the thermal displacement value of the main spindle contains the thermal displacement value of the spindle feed mechanism, it is possible to correct the thermal displacement of the main spindle accurately under consideration of various fluctuations of spindle thermal transmission rate, spindle hear capacity, workshop environment, etc., even if the main spindle is fed out over a long distance.

What is claimed is:

1. A thermal displacement correcting apparatus for a machine tools provided with a mechanism for feeding a main spindle, via a spindle feed mechanisms by applying a spindle feed command to a spindle feed motor, the apparatus comprising:

a plurality of magnetic flux generating bodies fixed to either the main spindle or the spindle feed mechanism;

a magnetic sensor fixed to the machine tool, for detecting magnetic flux generated by said magnetic flux generating bodies whenever said magnetic flux generating bodies are fed to respective predetermined spindle feed positions;

means for detecting thermal displacement values of either the main spindle or the spindle feed mechanism on the basis of an output of said magnetic sensor;

means for calculating thermal displacement correction values by comparing the detected thermal displacement values with previously determined reference values at each of the predetermined spindle feed positions, wherein said thermal displacement correction value calculating means first calculates a correction function on the basis of the detected thermal displacement values and the previously determined reference values, and then calculates the thermal displacement correction values from said correction function; and means for correcting the spindle feed command applied to the spindle feed motor on the basis of the calculated thermal displacement correction values.

2. The thermal displacement correction apparatus for a machine tool of claim 1, which further comprises means for moving said magnetic sensor to the vicinity of each magnetic flux generating body in a direction perpendicular to the main spindle, whenever each magnetic flux generating body is fed to its respective predetermined spindle feed position by the spindle feed mechanism in response to the spindle feed command, to input a detection signal of said magnetic sensor to said thermal displacement value detecting means.

3. The thermal displacement correction apparatus for a machine tool of claim 1, wherein when the spindle motor is a step motor, said spindle feed command correcting means corrects the number of pulses applied to the step motor.

4. The thermal displacement correction apparatus for a machine tool of claim 1, wherein the previously determined thermal displacement reference values are detected and stored before the main spindle or the spindle feed mechanism is thermally displaced.

5. The thermal displacement correction apparatus for a machine tool of claim 1, wherein the previously determined thermal displacement reference values are inputted manually to a storing means.

6. The thermal displacement correction apparatus for a machine tool of claim 1, wherein the thermal displacement correction is executed under and simultaneously with control of a numerical control system for the machine tool.

7. A method of correcting thermal displacement of a machine tool provided with a mechanism for feeding a main spindle via a spindle feed mechanism by applying a spindle feed command to a spindle feed motor, which comprises the steps of:

stopping the main spindle at a predetermined first spindle feed position for initialization;

feeding the main spindle to a second spindle feed position;

detecting the main spindle position magnetically with a predetermined sensitivity to obtain a second spindle feed position signal;

storing the detected second spindle feed position signal;

feeding the main spindle to a third spindle feed position;

detecting the main spindle position magnetically with the predetermined sensitivity to obtain a third spindle feed position signal;

storing the detected third spindle feed position signal;

calculating a correction function on the basis of the detected and stored second and third spindle feed position signals and previously determined reference values at the second and third spindle feed positions;

calculating thermal displacement correction values at the second and third spindle feed position in accordance with the calculated correction function; and correcting the spindle feed command applied to the spindle feed motor at the second and third spindle feed positions on the basis of the calculated thermal displacement correction values, respectively.

8. The method of correcting thermal displacement of a machine tool, which further comprises the step of detecting when a numerical control system of the machine tool is in a thermal displacement correction mode, in order to start the steps as defined in claim 7.

9. A thermal displacement correcting apparatus for a machine tool, provided with a mechanism for feeding a main spindle, via a spindle feed mechanism, by applying a spindle feed command to a spindle feed motor, the apparatus comprising:

at least one magnetic flux generating body fixed to the spindle feed mechanism;

a magnetic sensor, fixed to the machine tool, for detecting magnetic flux generated by said magnetic flux generating body whenever said magnetic flux generating body is fed to a predetermined spindle feed position;

means for detecting a thermal displacement value of the spindle feed mechanism on the basis of an output of said magnetic sensor;

means for moving said magnetic sensor to the vicinity of said magnetic flux generating body in a direction perpendicular to the main spindle, whenever said magnetic flux generating body is fed to the predetermined spindle feed position by the spindle feed mechanism in response to the spindle feed command, to input a detection signal of said magnetic sensor to said thermal displacement value detecting means;

means for calculating a thermal displacement correction value by comparing the detected thermal displacement value with a previously determined reference value at the predetermined spindle feed position, wherein said thermal displacement correction value calculating means first calculates a correction function on the basis of the detected thermal displacement value and the previously determined reference value, and then calculates the thermal displacement correction value from said correction function; and means for correcting the spindle feed command applied to the spindle feed motor on the basis of the calculated thermal displacement correction value.

10. The thermal displacement correction apparatus for a machine tool of claim 9, wherein when the spindle motor is a step motor, said spindle feed command correcting means corrects the number of pulses applied to the step motor.

11. The thermal displacement correction apparatus for a machine tool of claim 9, wherein the previously determined thermal displacement reference value is detected and stored before the main spindle or the spindle feed mechanism is thermally displaced.

12. The thermal displacement correction apparatus for a machine tool of claim 9, wherein the previously determined thermal displacement reference value is inputted manually to a storing means.

13. The thermal displacement correction apparatus for a machine tool of claim 9, wherein the thermal displacement correction is executed under and simultaneously with control of a numerical control system for the machine tool.

* * * * *